US009176888B2

(12) United States Patent
Martin

(10) Patent No.: US 9,176,888 B2
(45) Date of Patent: Nov. 3, 2015

(54) APPLICATION-MANAGED TRANSLATION CACHE

(71) Applicant: International Business Machines Corporation, Armonk, NY (US)

(72) Inventor: Andrew K. Martin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 13/644,784

(22) Filed: Oct. 4, 2012

(65) Prior Publication Data
US 2014/0101403 A1 Apr. 10, 2014

(51) Int. Cl.
*G06F 12/00* (2006.01)
*G06F 12/10* (2006.01)

(52) U.S. Cl.
CPC .............. *G06F 12/10* (2013.01); *G06F 12/109* (2013.01); *G06F 12/1009* (2013.01)

(58) Field of Classification Search
CPC . G06F 12/1027; G06F 12/1009; G06F 12/10; G06F 12/109; G06F 12/0802; G06F 2212/681; G06F 2212/654; G06F 12/1063; G06F 12/0292
See application file for complete search history.

(56) References Cited

U.S. PATENT DOCUMENTS

| 5,940,872 | A | 8/1999 | Hammond et al. |
| 6,604,184 | B2 | 8/2003 | Zahir et al. |
| 7,827,383 | B2 | 11/2010 | Spracklen et al. |
| 8,095,771 | B2 | 1/2012 | Sheu et al. |
| 2008/0270738 | A1 | 10/2008 | Makphaibulchoke et al. |
| 2009/0013149 | A1* | 1/2009 | Uhlig et al. .................... 711/207 |
| 2009/0113164 | A1 | 4/2009 | Rajamony et al. |
| 2010/0125708 | A1 | 5/2010 | Hall et al. |

OTHER PUBLICATIONS

Jacob, Bruce et al., "Uniprocessor Virtual Memory without TLBs", IEEE Transactions on Computers, vol. 50, No. 5, May 2001, 18 pages.
Qin, Wei et al., "A Technique to Exploit Memory Locality for Fast Instruction Set Simulation", 2005 6th Int'l. Conf. on ASIC Proc., IEEE, 2005, 4 pages.

* cited by examiner

*Primary Examiner* — Reginald Bragdon
*Assistant Examiner* — Thanh D Vo
(74) *Attorney, Agent, or Firm* — Stephen J. Walder, Jr.; William J. Stock

(57) ABSTRACT

Mechanisms are provided, in a data processing system, for accessing a memory location in a physical memory of the data processing system. With these mechanisms, a request is received from an application to access a memory location specified by an effective address in an application address space. A translation is performed, at a user level of execution, of the effective address to a real address table index (RATI) value corresponding to the effective address. At a hardware level of execution, a lookup operation is performed that looks-up the RATI value in a real address table data structure maintained by trusted system level hardware of the data processing system, to identify a real address for accessing physical memory. A memory location in physical memory is thereafter accessed based on the identified real address.

18 Claims, 5 Drawing Sheets

APPLICATION-MANAGED TRANSLATION CACHE

BACKGROUND

The present application relates generally to an improved data processing apparatus and method and more specifically to mechanisms for providing an application managed translation cache.

In modern computing devices, some measure of memory virtualization is utilized. With memory virtualization, applications typically utilize addresses within their own address space which is virtualized from the physical memory addresses. As a result, address translation between effective addresses (or virtual addresses) known to the application, and referring to addresses in an application address space, and physical memory addresses (or real addresses) used to specifically access the physical memory locations, i.e. in a physical address space, is required. In order to make such address translations more efficient, hardware based caches and accelerators, such as translation lookaside buffers and the like, have been developed to store translations for faster access. Such caches and accelerators are populated by system level trusted hardware or software.

SUMMARY

In one illustrative embodiment, a method, in a data processing system, is provided for accessing a memory location in a physical memory of the data processing system. The method comprises receiving a request from an application to access a memory location specified by an effective address in an application address space. The method further comprises performing, at a user level of execution, a translation of the effective address to a real address table index (RATI) value corresponding to the effective address. In addition, the method comprises performing, at a hardware level of execution, a lookup operation of the RATI value in a real address table data structure maintained by trusted system level hardware of the data processing system, to identify a real address for accessing physical memory. Moreover, the method comprises accessing a memory location in physical memory based on the identified real address.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
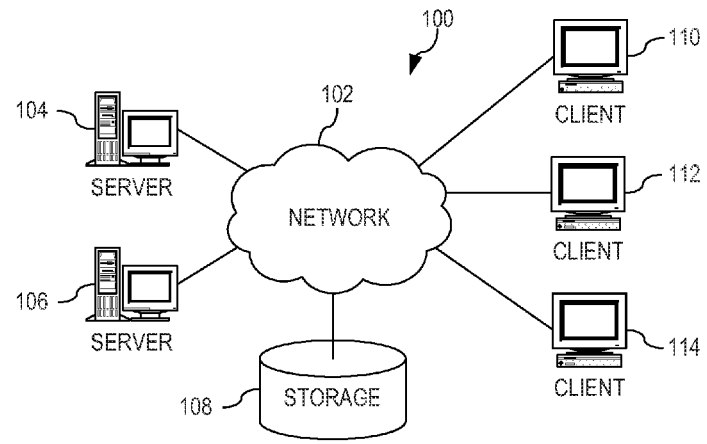
FIG. 1 is an example diagram of a distributed data processing system in which aspects of the illustrative embodiments may be implemented.

The illustrative embodiments provide mechanisms for providing an application managed translation cache in trusted system level hardware. The illustrative embodiments are especially well suited for addressing problems associated with the emerging field of coherent attached accelerators. An accelerator is a reconfigurable trusted hardware/software element, or set of elements, that perform a function to increase the speed by which operations are performed in a processor architecture. The present invention will focus primarily on trusted hardware implemented accelerators that are configured or dedicated to performing a particular operation to accelerate the execution of instructions in a processor architecture. An example of such a trusted hardware implemented accelerator may be a reconfigurable field programmable gate array (FPGA), for example. Other accelerators may be implemented in system level firmware or the like.

A coherent attached accelerator is an accelerator that shares an address space with an application running on the host system, in such a way that caches on the host system and accelerator are kept consistent. The application portions running on the host system's processor and the accelerator can therefor share data and communicate through shared memory. In contrast, an input/output (I/O) attached accelerator is seen by the host system's processor as an I/O device. Data to be shared must be explicitly marshaled back and forth between the host system's processor and the I/O attached accelerator With such coherent attached accelerators, address translation between effective addresses (or virtual addresses) known to the application, and physical memory addresses (or real addresses) is required. To achieve greater performance, address translations must be cached and may be pre-fetched.

In known microprocessor memory subsystems, the translation mechanism and associated cache are built into the hardware of the microprocessor. As such, the translation cache allocation and replacement policies are fixed. Trusted system level software and hardware is utilized to populate the translation cache with the address translations.

The limitations of these known translation mechanisms and associated caches becomes apparent when applied to a reconfigurable coherent attached accelerator. The software managed translation cache is not suitable for coherent attached accelerators. This is because with coherent attached accelerators, the accelerator must access arbitrary locations in the application's address space since, in general, it is not known a priori which data the coherent attached accelerator will need to access to perform the operation, and where the data will reside. For example, consider a coherent attached accelerator that performs the operation of searching a binary tree index to update all the records matching a particular criterion that is determined at runtime. In such a case, it is not possible to know a priori which data will be needed and where it will reside.

A fixed allocation/prefetch/replacement policy, provided by a trusted system-level hardware layer is not likely to meet performance goals. That is, the benefit of running an application on a configurable accelerator is that the hardware can be tuned to the needs of the application. However, implementing the translation and cache mechanisms in fixed hardware with a fixed policy defeats the benefits of a reconfigurable accelerator.

As a further consideration, the reason for limiting access to the translation cache and translation hardware mechanisms to only trusted system-level software is to ensure the security of the system, e.g., ensuring that one application does not have access to the translations of other applications and cannot corrupt such translations or access and/or modify data using such translations. That is, applications cannot be permitted to cache real/physical addresses, and use these real/physical addresses to access physical memory directly. To do so would defeat the security measures in place in the data processing system architecture.

The illustrative embodiments provide mechanisms for providing an application managed translation cache in trusted system level hardware. The illustrative embodiments address the problems associated with fixed hardware configuration and security issues discussed above by providing mechanisms that expose the address translation process to applications in a limited manner. With the mechanisms of the illustrative embodiments, a table of physical addresses that result from address translations is maintained in association with the trusted system-level hardware, e.g., the processor(s), main memory, memory controller(s), bridge chips sitting on the system bus, and most other hardware of the host system other than I/O devices which must access privileged resources through a trusted hardware device. Trusted system level hardware performs address translation when requested by an application and stores the result of such translation in a table data structure stored in a memory or other storage device accessible by the trusted system level hardware. The application uses indices into this table data structure to refer to translation results. Thus, the application is only aware of a mapping from the effective (or virtual) address in the application address space to the index into the table data structure. The index then is used to access the actual physical (or real) address corresponding to the index, and thus the effective (or virtual) address. In this way, the application is given limited access to the physical address through an indirection made possible by the index into an address mapping table stored and maintained by the trusted system level hardware and which is only accessible by the trusted system level hardware.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
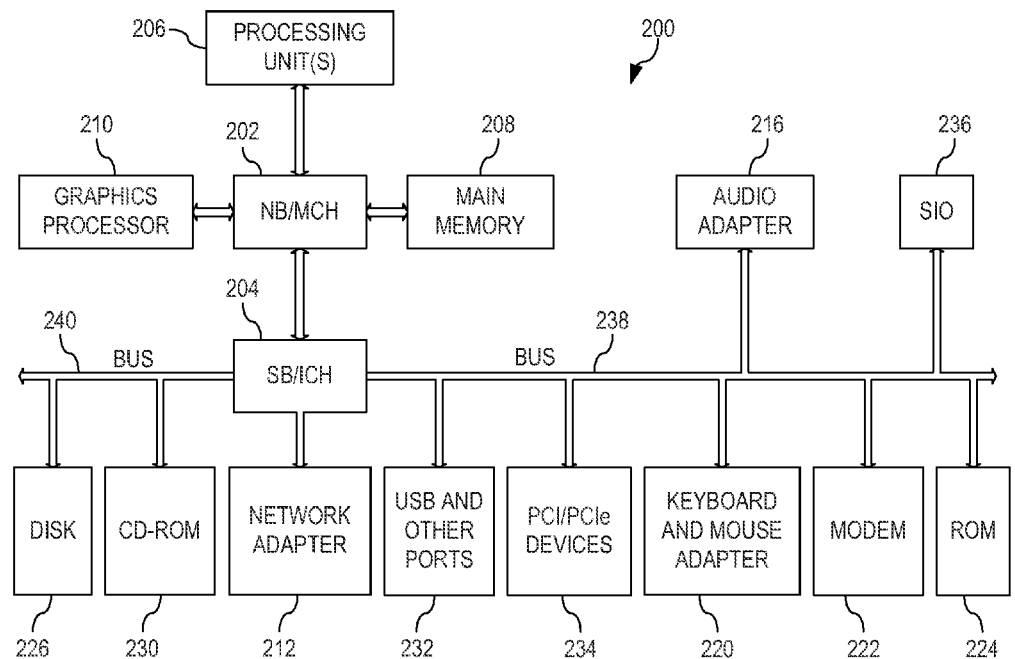
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

In order for applications executing on a processor, such as a processing unit 206 in the data processing system 200 for example, to access physical memory, such as main memory 208 for example, an address translation may be necessary if the data processing system utilizes virtualized memory, which is common with most modern processor architectures. However, with most modern processor architectures, the translation mechanisms are fixed in, and limited by, the translation hardware and its associated cache. Furthermore, one cannot allow software to have access to the physical addresses to achieve greater flexibility, such as when using coherent attached accelerators, since to do so may undermine the security of the processor architecture.

With the mechanisms of the illustrative embodiments, limited exposure of the translation process is given to the application, by providing a level of indirection between the application level address translation and the trusted system level address translation such that the application is not given direct access to the physical (or real) addresses but can still have greater flexibility in the management of its address translations. That is, the trusted system level hardware maintains and controls access to the physical address via a mapping between the physical address and an index value, referred to herein as the real address translation index (RATI). The application maintains its own mapping between its effective address and the RATI. Thus, the application does not have direct access to the physical address but can achieve some additional flexibility in maintaining its own address translations thereby avoiding the limitations of fixed translation hardware and associated caches as described in greater detail hereafter. Thus, the illustrative embodiments separate the control of address translations between the "untrusted" application components which maintain a first address translation table and manages allocations, and the "trusted" hardware or system component which manages the second table containing the permissions and the real addresses.

Figure 3A:
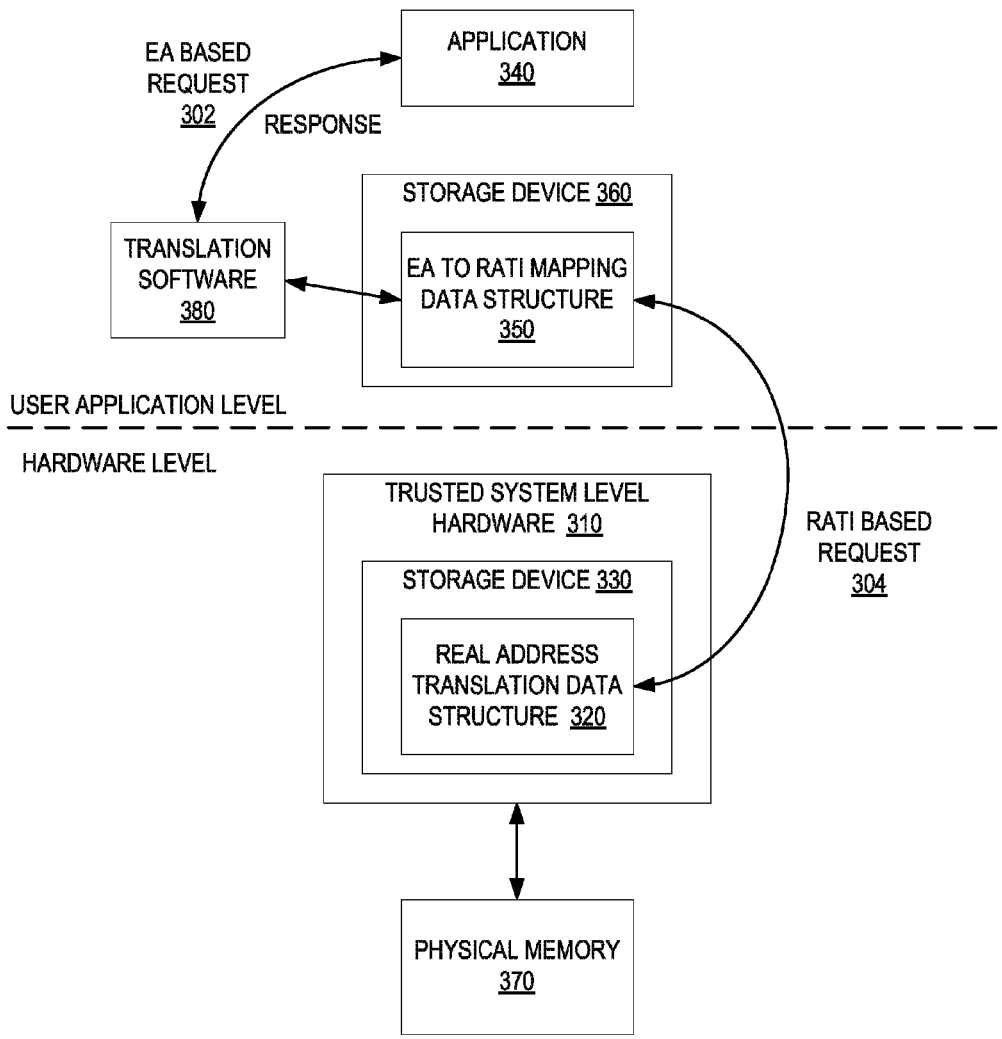
FIG. 3A is an example diagram illustrating the primary operational elements of one illustrative embodiment with regard to handling a request for accessing a portion of physical memory from an application.

FIG. 3A is an example diagram illustrating the primary operational elements of one illustrative embodiment with regard to handling a request for accessing a portion of physical memory from an application. As shown in FIG. 3A, trusted system level hardware 310 maintains a real (or physical) address table data structure 320 in a storage device 330. Entries in the real address table data structure 320 are indexed by a real address table index (RATI) and store the real page number, a real memory page size, and permissions. Other information for managing the physical memory corresponding to the real address and real memory page size may be included in the entry in the real address table data structure 320 depending upon the implementation.

The application 340 maintains its own effective address (EA) to RATI mapping data structure 350 in an application level storage device 360. This EA to RATI mapping data structure 350 maps an EA to a RATI which may then be used to send a memory access request to the trusted system level hardware 310 for accessing the physical memory. In this way, the application can use an EA to access memory, which is translated into an RATI which is subsequently used by the trusted system level hardware 310 to index into the real address table data structure 320 to obtain the real (or physical) address for accessing the physical memory 370.

Thus, when an application 340 needs to access a memory location, such as to read, write, or modify data in the memory location, the application 340 generates a memory access request 302 using an effective address (or virtual address) which is in the application 340 address space, i.e. a virtualized address space. The request 302 may include the effective address, an offset to specify a particular location in a memory page corresponding to the effective address, an access operation identifier specifying an operation to be performed on the particular memory location (e.g., read, write, modify), and the like. The request 302 may be provided to an application level address translation software module 380 (which although indicated to be a "software" module may, in some embodiments be implemented in reconfigurable hardware, such as a field programmable gate array (FPGA) or the like) which performs a lookup operation on the effective address in the effective address (EA) to real address table index (RATI) mapping data structure 350 to obtain the RATI corresponding to the EA in the request 302.

A request 304 is sent to the trusted system level hardware 310 using the RATI. The request 304 may include the RATI along with the offset, access operation identifier, and other information from the original request 302. The RATI in the request 304 is used to index 306 into the real address table data structure 320 to retrieve an entry identifying the real address (e.g., physical page number or the like), physical page size, and permissions information corresponding to the RATI. The entries in the real address table data structure 320 may further have valid bits identifying whether the entry is valid or not. Entries can be invalidated for various reasons including movement of data from one physical location to another, for example. A check of the entry's validity bit may be performed to ensure that the entry is still valid before using it to access physical memory, as described hereafter.

If the entry in the real address table data structure 320 corresponding to the RATI is valid, and the application has the requisite permissions to access the physical memory location in the manner specified by the access operation identifier, then the real memory page number, real memory page size, and offset are used to create a real (or physical) address for accessing a real location in real memory. Thus, the operation is allowed to access the real location and perform the corresponding actions, e.g., read, write, or modify.

The description of FIG. 3A assumes that there is an entry in the real address table data structure 320 for the RATI corresponding to the EA submitted by the application 340. However, the entry in the real address table data structure 320 is created in response to an initial request for the address translation and an entry not being already present in the real address table data structure 320, i.e. a translation request being submitted without a corresponding entry in the real address table data structure 320.

Figure 3B:
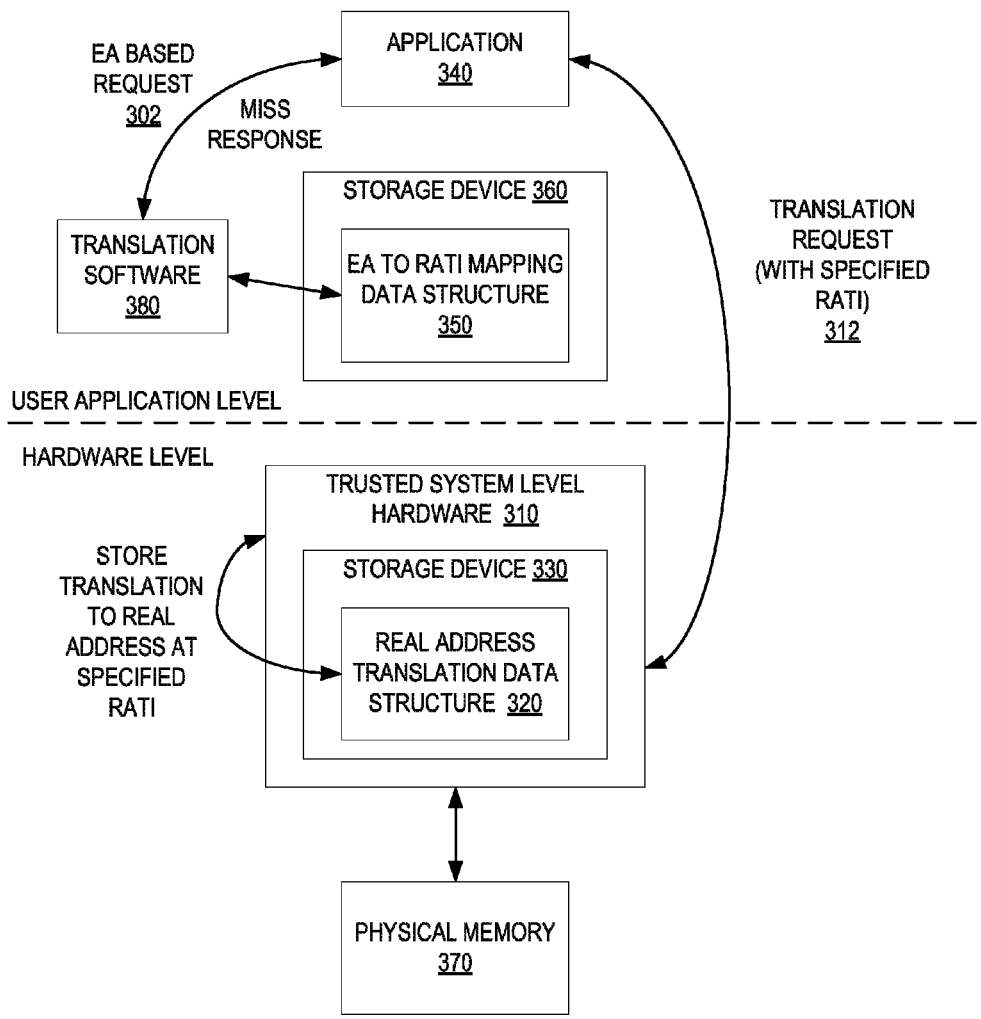
FIG. 3B is an example diagram illustrating the primary operational elements of one illustrative embodiment with regard to handling a translation request from an application.

FIG. 3B is an example diagram illustrating the primary operational elements of one illustrative embodiment with regard to handling a translation request from an application. As shown in FIG. 3B, when the application 340 needs to access a memory location, specified by an EA, for which it does not yet have a mapping to a RATI in the EA to RATI mapping table data structure 350, the miss on the lookup in the EA to RATI mapping table data structure 350 initiates a translation request 312 from the application 340 to the trusted system level hardware 310 to generate a translation and store it in an application specified RATI. Thus, the untrusted application 340 may instruct the trusted system level hardware 310 where to store the RATI to real address translation in real address translation table data structure 320. Thus, if the real address translation table data structure 320 becomes full, since the untrusted application 340 chooses the entry where the translation is stored in the real address translation table data structure 320, the untrusted application 340 controls which previous translation to discard.

In response to the translation request 312, the trusted system level hardware 310 attempts to generate a translation of the effective address to a real or physical address. The translation may be performed successfully or unsuccessfully. For example, a translation may fail if the effective address supplied has not been mapped to a real address. In some implementations, a translation may fail if the effective address supplied has been swapped out onto disk, requiring operating system or hypervisor intervention to restore it. In some implementations this may be handled automatically, such that, to perform the translation, the hardware will look up the effective address in a translation table maintained by the operating system. If the effective address is not present in the translation table, or is present but has been marked invalid or swapped out, then the translation would fail. There are many variations to these implementations depending upon the particular processor architecture.

If the translation is successful, a corresponding entry in the real address translation table data structure 320 is created with the real address information, e.g., the real memory page number, the real memory page size, permission bits set accordingly, and the like, (this information is all available from the operating system or hypervisor as is generally known in the art) and with the entry marked as "valid" by setting an appropriate valid bit. In addition, an indication of the successful translation is returned to the application 340 to indicate to the application 340 that the entry for the translation of the EA to a real (or physical) address is stored in the entry corresponding to the specified RATI. As a result, an entry in the EA to RATI mapping table data structure 350 is generated that maps the EA to the specified RATI.

The mechanisms of the illustrative embodiments further provide for invalidation of translations when situations indicate that the translations are no longer valid, such as in response to a copy on write operation, a page of memory being moved to another physical location, or other event occurring requiring a need to invalidate a translation. In response to the detection of such an occurrence, or in response to a specific request to invalidate a particular translation, such as from application 340, or the like, the valid bit of a corresponding entry in the real address translation mapping table data structure 320 are set to an invalid state. The invalidate request that causes the entry to be invalidated may be generated by the operating system, hypervisor, or the like.

For example, in a known processor architecture, assume that the user application has run into some sort of problem during execution and has made a system-call to the hypervisor. The hypervisor, as a result, has decided to make a change to the way memory is mapped. The hypervisor will thus, go through a long an involved process of changing the page table (at least marking the relevant entries invalid), making sure all outstanding accesses to those locations have completed (which in the Power PC is done by executing a Translation Lookaside Buffer Invalidate Entry (TLBIE) instruction followed by a tbsync instruction, for example). These instructions, when executed, will cause the corresponding transactions to be issued on the PowerBus of the Power PC architecture. Then the hypervisor will move the data, update the page tables, and restart the faulting process.

In one illustrative embodiment of the present invention, were it implemented on a Power PC system, for example, and connected to the PowerBus, the trusted system-level hardware on coherent attached accelerator would receive the TLBIE transaction and invalidate the corresponding entry. To do this, the trusted system level hardware 310 maintains the effective address in its real address translation table data structure 320. When the trusted system level hardware 310 receives the TLBIE transaction, the hardware 310 would temporarily suspend further memory transactions and then walk through its table 320 invalidating all matching entries. Once the walk through has completed, memory transactions may once again be resumed. Of course, other optimizations to this process may be implemented without departing from the spirit and scope of the illustrative embodiments.

It should be noted that with the mechanisms of the illustrative embodiments, each application 340 may maintain its own EA to RATI mapping table data structure 350. As a result, there may be separate trusted system level hardware 310 managed real address translation mapping data structures 320 or separate portions of a same real address translation mapping data structure 320 for the various applications 340.

As such, the applications 340 may choose which of the entries in real address translation mapping table data structure 320 are replaced and may prefetch translations as needed into the real address translation mapping table data structure 320. Moreover, the trusted system level hardware 310 may operate to ensure that an application 340 only accesses valid physical addresses that contain data to which it is permitted to access. Moreover, the mechanisms of the illustrative embodiments allow the trusted system level hardware 310 to invalidate translations in the real address translation mapping table data structure 320 when memory pages move or become swapped out.

It should be appreciated that the illustrative embodiments increase the security of the overall system not only because the user level applications cannot know the physical addresses of the memory which they are accessing, but also because the applications cannot access memory based upon a physical address that the application might supply. That is, by requiring that the application supply the RATI, a mechanism is provided to check and make sure that the source effective address has the correct permissions associated with it.

Furthermore, the illustrative embodiments provide greater flexibility than known address translation mechanisms in that the user level application controls the design, geometry, and replacement policy of the effective address to RATI mapping table data structure 350. For example, an application may have a number of direct memory access (DMA) engines, each of which is permanently associated with two RATIs, e.g., DMA engine 0 has RATIs 0 and 1, DMA engine 1 has RATIs 2 and 3, etc. Another application may have a 4-way set associative table, but may know that least recently used (LRU) is not a good replacement policy and, instead, implements a least frequently used (LFU) replacement policy. Another application may know that direct mapped memory is better for its memory access pattern. Each of these may be accommodated at the same time on the same architecture using the mechanisms of the illustrative embodiments because of the flexibility of the EA to RATI mapping table data structure 350.

Figure 4:
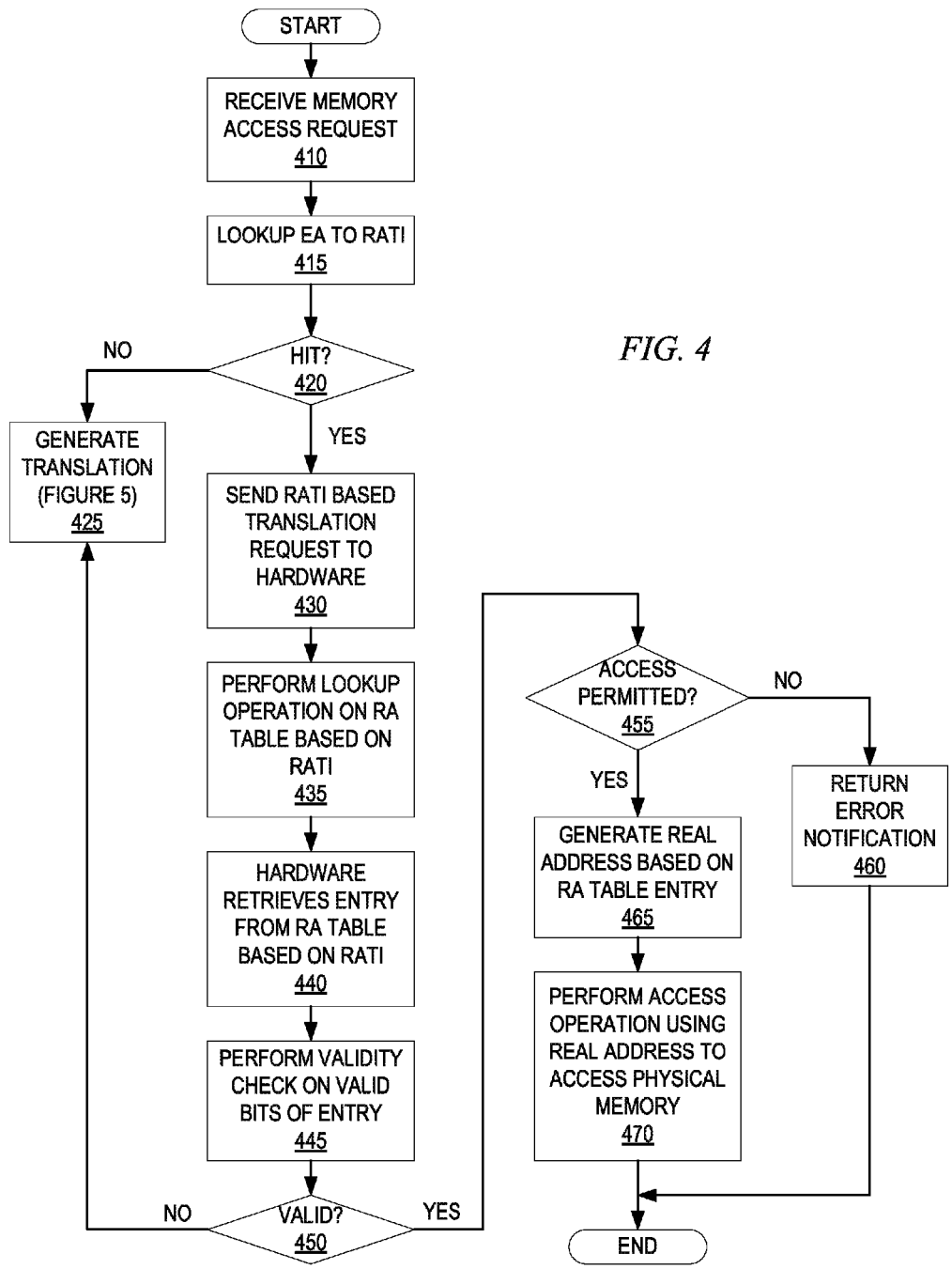
FIG. 4 is a flowchart outlining an example operation for performing an address translation operation in accordance with one illustrative embodiment.

FIG. 4 is a flowchart outlining an example operation for performing an address translation operation in accordance with one illustrative embodiment. The operations outlined in FIG. 4 may be implemented, for example, using a combination of software based management of an EA to RATI table data structure at the application level and trusted system level translation hardware that maintains a RA translation table data structure, as described previously. By splitting the address translation between these mechanisms and providing a level of indirection via the RATI, flexibility is provided at the application level while ensuring security via the trusted system level hardware.

As shown in FIG. 4, the operation starts by receiving a memory access request from an application (step 410). The memory access request specifies an effective address, offset, access operation identifier (e.g., read, write, modify, etc.), and the like. A lookup in an effective address (EA) to real address table index (RATI) table data structure is performed to identify a corresponding entry for the effective address, if one exists (step 415). A determination is made as to whether an entry in the EA to RATI table data structure corresponding to the EA in the request is found (step 420). If not, then the translation generation operation outlined in FIG. 5 is executed (step 425).

If an entry in the EA to RATI table data structure does exist for the EA in the request, then a translation request is sent to the trusted system level hardware for a translation of the EA to a real (or physical) address (step 430). The translation request specifies the RATI, the offset, and other information necessary for facilitating the translation of the address into a real address and to perform the actual memory access. The trusted system level hardware performs a lookup operation in a corresponding real address translation table data structure for an entry corresponding to the RATI in the translation request (step 435). The entry in the real address translation table data structure corresponding to the RATI is retrieved (step 440) and valid bits are checked for the entry to determine if the entry is still valid (step 445). If the entry is not valid, then a corresponding response is returned back to the application which then initiates a translation request as outlined in FIG. 5 (step 450).

If the entry is valid, a determination is made, based on permissions information stored in the valid entry, whether the application has permission to perform the requested memory access operation on the corresponding memory location represented by the entry (step 455). If the application does not have the necessary permissions for performing the requested memory access operation, then an error response is returned to the application indicating that the requested memory access operation cannot be completed because the application does not have the required permissions (step 460). If the application does have the necessary permissions, then the real page number, real page size, the offset specified in the request, and the like are used to generate a real (or physical) address for accessing the physical memory location corresponding to the effective address and offset submitted by the application (step 465). The real address is then used to perform the requested memory access operation on the physical memory location (step 470) and the operation terminates.

Figure 5:
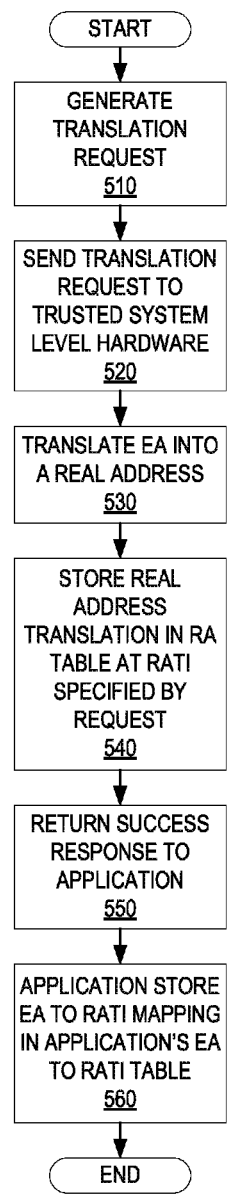
FIG. 5 is a flowchart outlining an example operation for generating a translation of an address in accordance with one illustrative embodiment.

FIG. 5 is a flowchart outlining an example operation for generating a translation of an address in accordance with one illustrative embodiment. The operations outlined in FIG. 4 may again be implemented, for example, using a combination of software based management of an EA to RATI table data structure at the application level and trusted system level translation hardware that maintains a RA translation table data structure.

As shown in FIG. 5, in response to a memory access attempt using an EA for which there is no current EA to RATI mapping entry in the application's EA to RATI table data structure, in response to an invalid RA translation table entry being identified, or the like, a translation request is generated by the application (step 510). The translation request may specify the effective address and RATI into which the translation is to be stored, for example. The translation request is sent from the application to the trusted system level hardware (step 520) which translates the effective address to a real address (step 530). The real address information, including real page number, read page size, and the like, along with permissions information is stored in the real address translation table data structure entry corresponding to the RATI specified in the translation request and the entry is marked valid in the valid bits of the entry (step 540). A response is returned to the application indicating successful completion of the translation (step 550). The application then stores an entry in the EA to RATI table data structure specifying the mapping of the EA to the specified RATI along with other information for facilitating memory accesses using the EA (step 560). Thereafter, the entry in the EA to RATI table data structure may be used by the application to index into the RA table maintained by the trusted system level hardware so as to obtain a real address for accessing real (or physical) memory. The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for accessing a memory location in a physical memory of the data processing system, comprising:
   receiving a request, from an application, to access a memory location specified by an effective address in an application address space;
   performing, at a user level of execution, a translation of the effective address to a real address table index (RATI) value corresponding to the effective address;
   performing, at a hardware level of execution, a lookup operation of the RATI value in a real address table data structure maintained by trusted system level hardware of the data processing system, to identify a real address for accessing physical memory;
   accessing a memory location in the physical memory based on the identified real address;
   generating, by the application, an address translation request that requests a translation of the effective address into the real address, wherein the address translation request specifies a RATI of the real address table where results of the address translation are to be stored:
   performing, by the trusted system level hardware, the translation of the effective address to the real address;
   storing the real address for the effective address in an entry of the real address table corresponding to the RATI specified by the application in the address translation request;
   storing, by the application, the effective address to RATI mapping entry in an effective address to RATI mapping table data structure maintained at the user level in association with the application; and
   wherein the real addresses for accessing the physical memory are not directly accessible outside of the hardware level of execution, are maintained only in the real address table data structure in the trusted system level hardware, and are only indirectly accessible, via RATI values, by the application at the user level of execution via the effective address to RATI mapping table data structure.

2. The method of claim 1, wherein performing a translation of the effective address to a RATI value comprises performing a lookup operation that looks-up the effective address in the effective address to RATI mapping table data structure.

3. The method of claim 2, wherein the data processing system executes a plurality of applications, and wherein each application has its own associated effective address to RATI mapping table data structure.

4. The method of claim 1, wherein the RATI is an index into the real address table data structure identifying an entry of the real address table that stores the real address corresponding to the effective address.

5. The method of claim 4, wherein accessing the memory location in the physical memory based on the identified real address comprises:
   performing a validity check on valid bits stored in the entry of the real address table to determine if the entry is valid;
   performing a permissions check on permission information stored in the entry of the real address table to determine if the application is permitted to access the memory location; and
   accessing the memory location only in response to the validity check resulting in a determination that the entry is valid and the permissions check indicating that the application is permitted to access the memory location.

6. The method of claim 1, wherein the trusted system level hardware comprises a hardware-implemented coherent attached accelerator.

7. A computer program product comprising a non-transitory computer readable storage medium having a computer readable program stored therein,
   wherein the computer readable program, when executed on a data processing system,
   causes the data processing system to:
   receive a request from an application to access a memory location specified by an effective address in an application address space;
   perform, at a user level of execution, a translation of the effective address to a real address table index (RATI) value corresponding to the effective address;
   receive, from trusted system level hardware of the data processing system, at a hardware level of execution, a real address for accessing physical memory identified via a lookup operation, performed by the trusted system level hardware, of the RATI value in a real address table data structure maintained by the trusted system level hardware of the data processing system;
   access a memory location in physical memory based on the identified real address;
   generate, by the application, an address translation request that requests a translation of the effective address into the real address, wherein the address translation request specifies a RATI of the real address table where results of the address translation are to be stored;
   receive, from the trusted system level hardware, the translation of the effective address to the real address;
   store, by the application, the effective address to RATI mapping entry in an effective address to RATI mapping table data structure maintained at the user level in association with the application, wherein the real address corresponding to the effective address is stored in an entry of the real address table corresponding to the RATI specified by the application in the address translation request; and wherein the real addresses for accessing the physical memory are not directly accessible outside of the hardware level of execution, are maintained only in the real address table data structure in the trusted system level hardware, and are only indirectly accessible, via RATI values, by the application at the user level of execution via the effective address to RATI mapping table data structure.

8. The computer program product of claim 7, wherein performing a translation of the effective address to a RATI value comprises performing a lookup operation that looks-up the effective address in the effective address to RATI mapping table data structure.

9. The computer program product of claim 8, wherein the data processing system executes a plurality of applications, and wherein each application has its own associated effective address to RATI mapping table data structure.

10. The computer program product of claim 7, wherein the RATI is an index into the real address table data structure identifying an entry of the real address table that stores the real address corresponding to the effective address.

11. The computer program product of claim 10, wherein accessing the memory location in the physical memory based on the identified real address comprises:
   performing a validity check on valid bits stored in the entry of the real address table to determine if the entry is valid;
   performing a permissions check on permission information stored in the entry of the real address table to determine if the application is permitted to access the memory location; and
   accessing the memory location only in response to the validity check resulting in a determination that the entry is valid and the permissions check indicating that the application is permitted to access the memory location.

12. The computer program product of claim 7, wherein the trusted system level hardware comprises a hardware-implemented coherent attached accelerator.

13. A data processing system, comprising:
   a processor comprising trusted system level hardware; and
   a memory coupled to the processor and comprising instructions executed by the processor to implement one or more applications, wherein the processor operates to:
   receive a request from an application to access a memory location of the memory specified by an effective address in an application address space;
   perform, at a user level of execution, a translation of the effective address to a real address table index (RATI) value corresponding to the effective address;
   perform, at a hardware level of execution, a lookup operation of the RATI value in a real address table data structure maintained by the trusted system level hardware of the data processing system, to identify a real address for accessing physical memory;
   access a memory location in physical memory based on the identified real address;
   generate, by the application, an address translation request that requests a translation of the effective address into the real address, wherein the address translation request specifies a RATI of the real address table where results of the address translation are to be stored;
   perform, by the trusted system level hardware, the translation of the effective address to the real address;
   store the real address for the effective address in an entry of the real address table corresponding to the RATI specified by the application in the address translation request;
   store, by the application the effective address to RATI mapping entry in an effective address to RATI mapping table data structure maintained at the user level in association with the application; and
   wherein the real addresses for accessing the physical memory are not directly accessible outside of the hardware level of execution, are maintained only in the real address table data structure in the trusted system level hardware, and are only indirectly accessible, via RATI values, by the application at the user level of execution via the effective address to RATI mapping table data structure.

14. The data processing system of claim 13, wherein performing a translation of the effective address to a RATI value comprises performing a lookup operation that looks-up the effective address in the effective address to RATI mapping table data structure.

15. The data processing system of claim 14, wherein the data processing system executes a plurality of applications, and wherein each application has its own associated effective address to RATI mapping table data structure.

16. The data processing system of claim 13, wherein the RATI is an index into the real address table data structure identifying an entry of the real address table that stores the real address corresponding to the effective address.

17. The data processing system of claim 16, wherein accessing the memory location in the physical memory based on the identified real address comprises:
   performing a validity check on valid bits stored in the entry of the real address table to determine if the entry is valid;
   performing a permissions check on permission information stored in the entry of the real address table to determine if the application is permitted to access the memory location; and
   accessing the memory location only in response to the validity check resulting in a determination that the entry is valid and the permissions check indicating that the application is permitted to access the memory location.

18. The data processing system of claim 13, wherein the trusted system level hardware comprises a hardware-implemented coherent attached accelerator.

* * * * *